April 26, 1955 P. C. JANSEN 2,706,930
PROJECTION SCREEN
Filed Aug. 4, 1948 4 Sheets-Sheet 1

PIETER CORNELIS JANSEN
INVENTOR
BY
AGENT

PIETER CORNELIS JANSEN
INVENTOR

April 26, 1955　　　　P. C. JANSEN　　　　2,706,930
PROJECTION SCREEN

Filed Aug. 4, 1948.　　　　　　　　　　4 Sheets-Sheet 4

PIETER CORNELIS JANSEN
INVENTOR

BY
AGENT 2,706,930
Patented Apr. 26, 1955

United States Patent Office

2,706,930

PROJECTION SCREEN

Pieter Cornelis Jansen, Eindhoven, Netherlands, assignor to Hartford National Bank and Trust Company, Hartford, Conn., as trustee Application August 4, 1948, Serial No. 42,514

Claims priority, application Netherlands August 21, 1947

5 Claims. (Cl. 88—28.93)

This invention relates to a projection device having an area of image in which at least one raster of equidistant straight lines coincides with at least one raster of equidistant circular lines, more particularly a televsion receiver.

Applicant has found that with such projection devices circumstances may occur due to which anomalies appear in the image. Before describing the steps taken for avoiding the defects, these circumstances will be discussed with reference to the accompanying drawings, given by way of example.

Figure 1:
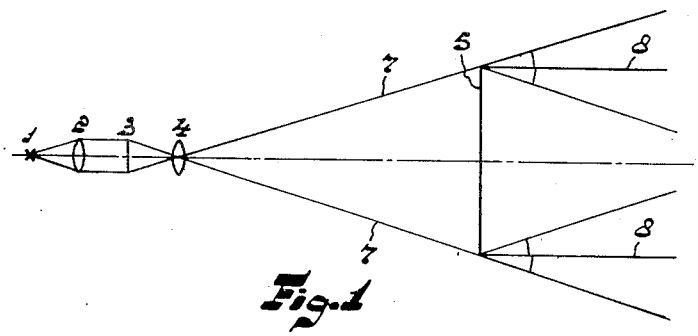
Fig. 1 is a diagrammatic section of a known projection device, for example a film projector.

The projection device comprises a source of light 1, a condenser 2, an object to be projected, for instance a film 3 and an object glass 4. The image is cast on a screen 5, in the present case a translucent screen.

Figure 2:
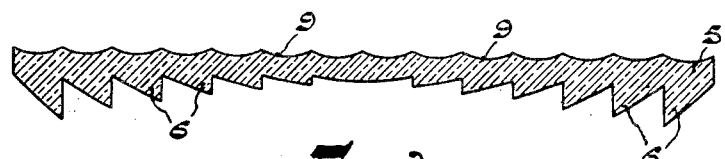
Fig. 2 is a section on enlarged scale of a known projection screen to be used with such a projection device.

At one side of such screens a so-called Fresnel surface is often formed i. e. provided with a raster or prismatic grooves with a gradually varying profilation, in the form of circles or an Archimedean spiral conferring the reflecting properties of a lens on the flat screen. In Fig. 2 these ribs are designated 6. Due to this Fresnel surface the light rays, for instance the rays 7, falling on the screen at the edge are diffused in a spatial angle of which the axes 8 are no longer in line with the rays 7, but of which these axes are bent together. As a result thereof the screen appears brighter to the observer.

It is not vital to the invention whether the circular lines forming the Fresnel surface are pure circles or form an Archimedean spiral.

It is known to provide the screen at the other side with a raster of straight grooves 9, sometimes two of such crossed rasters, in order to direct the light radiated by the screen, which would be lost in the auditorium far above and below the screen, more into the direction of the audience. By these means it is ensured that the space from which the image is clearly visible, becomes comparatively broad and low.

In the drawing the ribs 6 and the grooves 9 are greatly exaggerated. They are chosen to be so narrow as to be imperceptible when viewed at some distance from the screen. The width may, for instance, be of the order of 0.5 mm.

Figure 3:
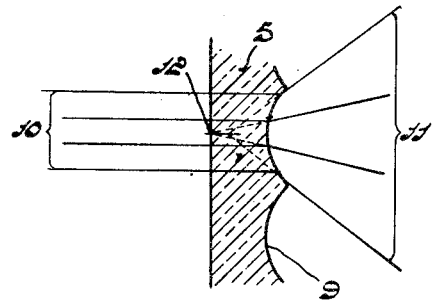
Fig. 3 illustrates the path of a light beam through such a screen.

If an image is cast on such a screen the latter will not blink evenly. The raster of straight grooves exhibit alternating bright and dark lines, since, as appears from Fig. 3, a beam of parallel incident light rays 10 is so refracted as to form a diverging beam 11 and a virtual image 12. Since the groove is straight this image exhibits the form of a narrow band, the space between two bands being dark.

The Fresnel surface also exhibits dark lines. Due to the inactive parts constituting the transition of one rib into the other.

These lines exhibit the form of circles or of an Archimedean spiral. As has been pointed out, however, the grooves and ribs are too narrow so that the dark and bright lines also are so crowded that they are not troublesome viewing the image projected.

Such a raster of straight lines is formed in a telesivion image. The drawing does not represent a television receiver, but the path of the light rays therein appears from Fig. 1, if the source of light 1, the condenser 2 and the film 3 are replaced by a cathode-beam tube of which the screen is located at 3.

Applicant has found that if a raster of straight lines coincides with a raster of circles (or with a raster in the form of an Archimedean spiral which, owing to the small relative spacing of the lines, makes no difference in the present case) anomalies do occur in the image. These exhibit the form of definite figures, so-called moiré figures, which are formed by lines that are much more spaced apart from each other than those of the circle raster or line raster.

Figure 4:
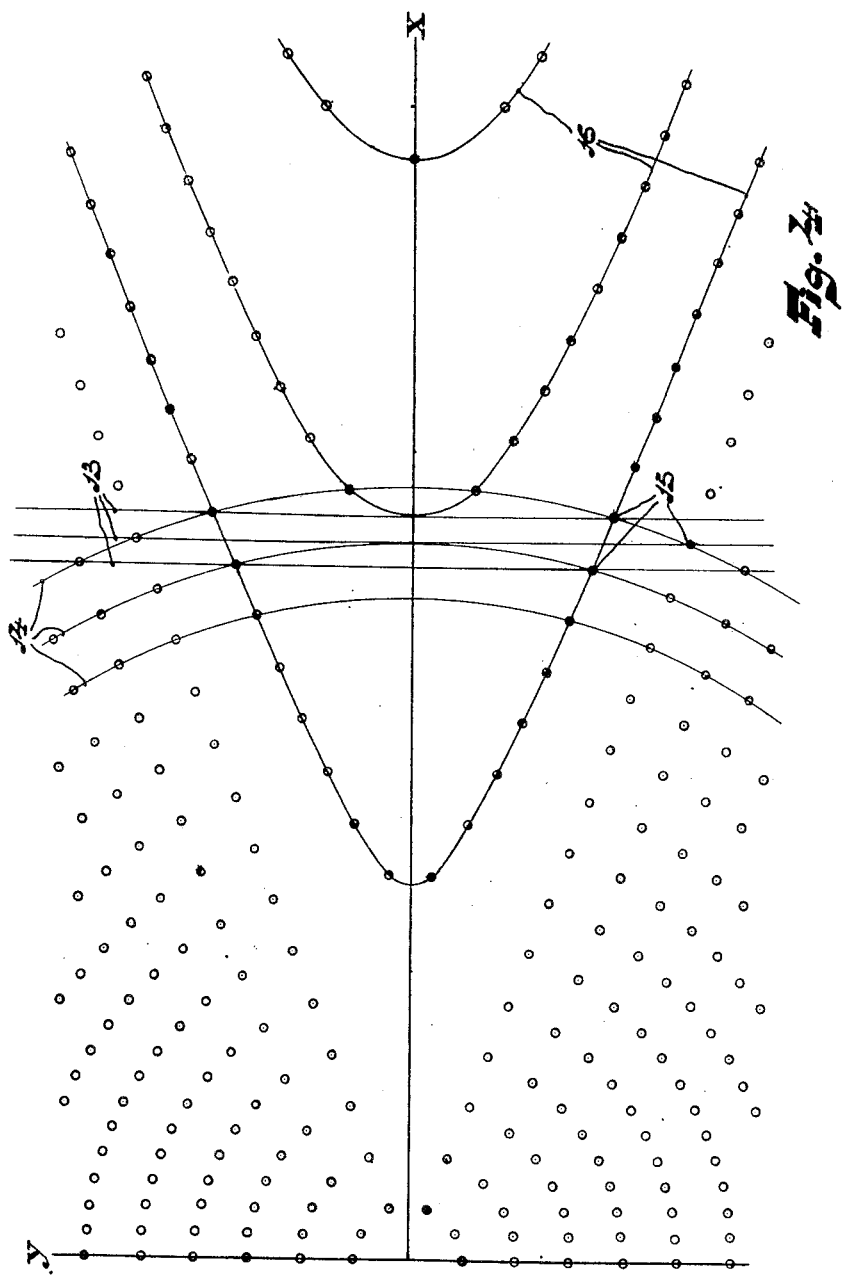
Fig. 4 illustrates the anomalies which may occur on such a screen.

Fig. 4 illustrates how these moiré figures may be formed. It has been assumed that a raster having dark straight parallel lines 13 (of which only three are shown) coincides with another raster of equidistant dark circles 14 of which also only a few are shown. At the points of intersection of the dark lines, dark points or patches 15 are observed.

Owing to the small relative spacing of the lines the initial rasters are not perceived by the eye, but the eye arranges the dark points involuntarily into lines which may be spaced much more widely apart, so that they may be annoying. Three of these lines are shown in the drawing and designated 16. It is clearly visible that the relative spacing of these lines 16 considerably exceeds the spacing of the lines of the initial rasters and furthermore that the spacing is a maximum where the straight lines of one raster are about tangent to the circles of the circle raster i. e. in the proximity of a X-axis. At a greater distance from the centre the moiré figures are most troublesome, since the circles extend over a greater distance substantially parallel with the straight lines, and the losses of light are a maximum at the rims of the Fresnel lens.

The invention is based on the realisation that the appearance of moiré figures is reduced if the lines of the rasters, particularly where the tangents to the circular line extend substantiailly parallel with the straight lines, exhibit more intersections or the parallel parts are shorter.

According to the invention the lines of at least one of the rasters, in the plane of the area of image, are waveshaped.

In this respect it is to be noted that the expressions straight lines and circular lines should not be treated strictly geometrically in the present specification. They do not exclude that the straight lines and circular lines which exhibit a wave-form, as also appears from the following.

Throughout the specification the expression "area of image" is to be understood to include a mathematical plane. If two rasters, for instance a circle raster and a straight-line raster extend parallel and close together, for instance at the front side and at the back of the screen, this is the same, for the appearance of the said effects as if they coincide completly.

If the circular lines form an Archimedean spiral and are wave-shaped, the advantage is obtained that the waves on the spiral can be cut continuously.

In order that, in the area where the tangents to the circles extend parallel with the straight lines, the parallel lines are as short as possible it is desirable that both the circular lines and the straight lines should exhibit a waveform in such manner as to be in phase-opposition in the said area, the circular lines being arranged in circles.

The wavelength is preferably chosen to be $$\lambda = \frac{\pi a}{n}$$

where $a$ represents the relative spacing of the circular lines and $n$ is an arbitrary whole number and consequently equal to 1, 2, 3 and so on.

The invention moreover relates to a projection screen furnished with rasters satisfying the aforesaid conditions.

If such a screen is made by providing a raster of equidistant lines by means of a cutting tool, this is preferably effected by setting this tool in vibration in a direction at right angles to the direction of the lines, and in the plane of the raster.

The tool is adapted to be set in vibration electromagnetically by means of a current which is derived from a scanning device and a sound track, of which the relative movement is synchronous to that of the tool with respect to the screen.

In order that the invention may be clearly understood and readily carried into effect, it will now be described more fully with reference to the accompanying drawings, given by way of example, which represent several embodiments thereof.

Figure 5:
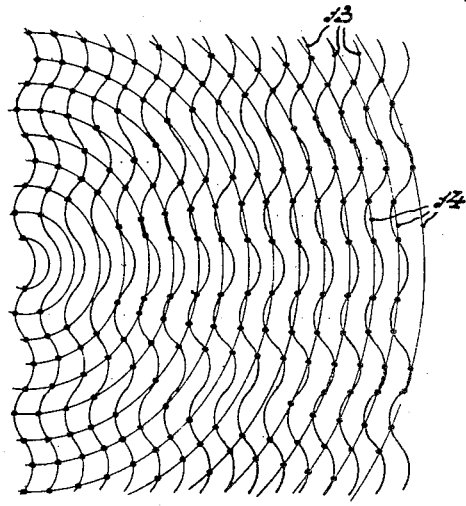

Fig. 5 illustrates diagrammatically the coincidence of two rasters, one of which consists of pure circles, whereas the other is built up of wave-shaped straight lines.

Figure 6:
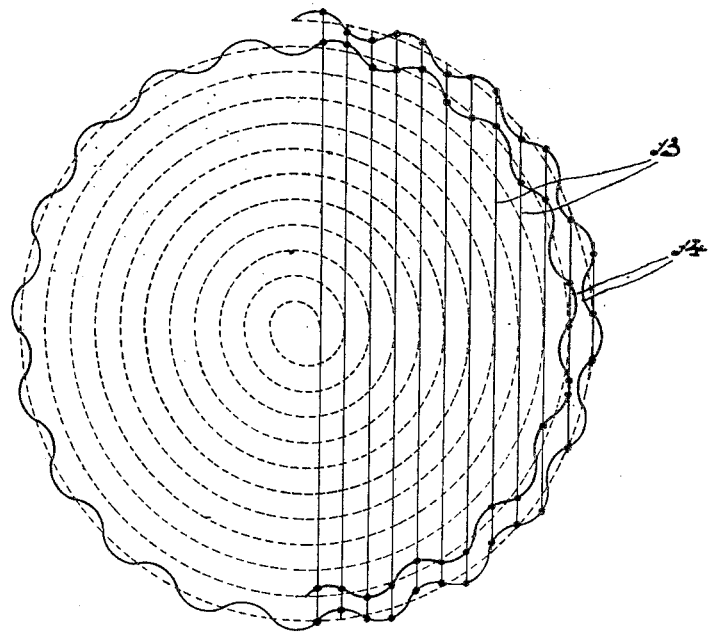

Fig. 6 likewise illustrates the coincidence of two rasters of which one consists of wave-shaped circular lines, whereas the other is built up of straight lines.

Figure 7:
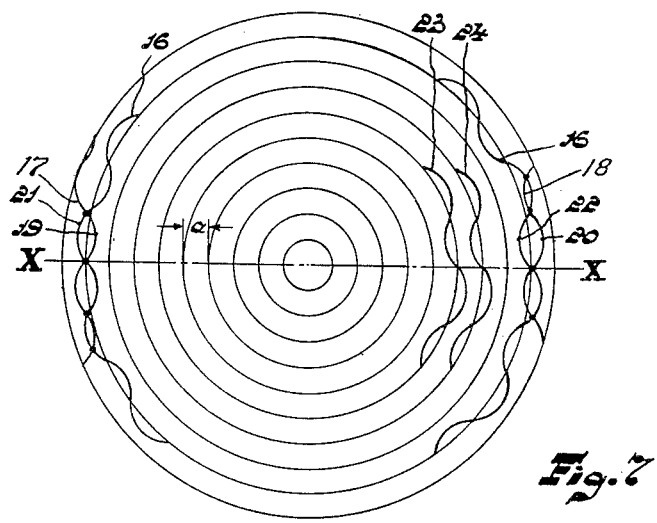

Fig. 7 illustrates schematically the coincidence of a wave-shaped circle raster and a wave-line raster.

Figure 8:
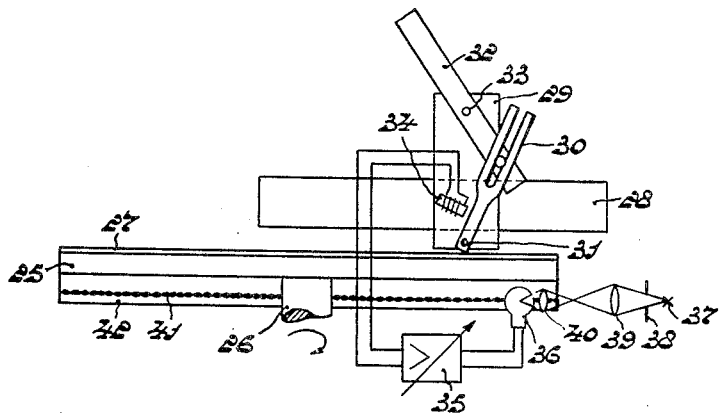

Fig. 8 is a side view of a device for cutting a wave-line raster.

The rasters of wave-shaped straight lines 13 and circular lines 14 shown in Fig. 5 both exhibit the same relative spacing between circular and straight lines respectively. In this event the conditions for forming moiré figures are very favourable as has been explicitly described in U. S. Patent No. 2,567,654. In this event the straight lines are wave-shaped with an amplitude which is approximately one half of the relative spacing of the lines and a wavelength amounting to four times this relative spacing. It clearly appears from the drawing that in this event the number of intersections of each line 13 with each circle, in the range where the moiré figures would be very marked (Fig. 4), is considerably increased, with the result that these figures are no longer troublesome.

Fig. 6 illustrates the same if the circular lines are wave-shaped. In this figure the circular lines are formed by an Archimedean spiral. From the figure it appears that such a raster of circular lines 14 which are arranged to form an Archimedean spiral can be made continuously, for instance cut, without experiencing the difficulties which would occur with pure circles where the beginning and the end of each line merge into each other. In the case shown in the drawing, however, the amplitude of the wave should not be such that the waves of adjacent circular lines interlace.

Fig. 7 shows how the disadvantage that the circular lines and the straight lines remain close together over a great distance in the area, where the tangents to the circular lines of a raster extend parallel with the straight lines of another raster, may be removed for the greater part if both the circular lines and the straight lines are wave-shaped and the waves of the circular lines are in phase-opposition to the waves of the straight lines.

Considering the circular line 16, for instance, this extends in the area near the X-axis over some distance parallel with two wave-shaped straight lines 17 and 18. Since in the raster of these straight lines, all lines should preferably lie regularly adjacent each other, the line 18 must exhibit a wave 20 to the right where the line 17 exhibits a wave 19 to the right. At these points, consequently, the circular line must exhibit two waves 21 and 22 which are both curved to the left. This will be the case if the number of whole wavelengths, into which the circular line is divided, is uneven.

Furthermore it is necessary that the waves of adjacent circular lines in the proximity of the X-axis should be in phase, as appears for the two lines 23 and 24. Assuming the spacing between two circular lines to be $a$, then the difference of their circumferences will be $2\pi a$. To satisfy the condition that both the circular line 23 and the circular line 24 comprise an odd number of wavelengths $\lambda$, the difference of these numbers should be even, for instance equal to $2n$, where $n$ is a whole number, and these wavelengths occupy a length $$2n\lambda = 2\pi a$$

hence $$\lambda = \frac{\pi a}{n}$$

Alternatively, the same number of wavelengths may be provided on all circular lines, which wavelengths are in phase throughout the circumference. In this event it is desirable that the amplitude of the circular lines near the centrum is smaller than those of the circular lines far remote from the centrum, since otherwise the ratio between wavelength and amplitude with the first-mentioned is so small that the lines cannot be intersected or only with difficulty. With this circle raster equality of phase with a raster of wave-shaped straight lines is not possible, unless the wavelength of these straight lines would also decrease in accordance as to whether they approach more closely to the centre.

The production of the wave-shaped lines may, in general, be effected by setting a cutting tool in vibration. Of this method an example will be given for use in the last-mentioned case in which the same number of wavelengths lies on all circles. On a table 25 which is made to rotate by means of a shaft 26, a plate 27 of transparent material is laid, for instance a plate of polystyrene. Above this plate a fixed support 28 is provided on which a slide 29 is adapted to move in a manner not shown. A cutting tool, for instance a chisel 30, is hinged to the slide 29 by means of a shaft 31. The position of the chisel is controlled in such manner, for instance by means of a lever 32 which is pivoted on a shaft 33, as to produce a Fresnel lens. Such devices have been described explicitly in U. S. Patent No. 2,616,178. In the present case the chisel is, moreover, adapted to be vibrated by means of an electromagnet 34 which is also mounted on the slide 29 and supplied from an amplifier 35. This amplifier receives a signal from a photo-electric cell 36 which is illuminated by an optical system comprising a source of light 37, a stop 38, a condenser 39 and an object glass 40. The beam of light thus formed is modulated by a soundtrack 41 which is secured on a film 42 to the table 25. The grooves thus cut will exhibit waves which are all in phase. By amplification control (which control can easily be coupled to the position of the slide) it can be ensured that the amplitudes of the waves become smaller with a smaller radius of the circular lines cut.

What I claim is:

1. A projection device comprising screen means including a translucent plate forming an area of image, said screen means having at least one raster of grooves on one side thereof extending along straight directions equidistantly spaced apart, and at least one raster of grooves on the other side thereof extending along curved directions equidistantly spaced apart, said first named raster of grooves having parts thereof which coincide optically with parts of said second named raster of grooves, said grooves of at least one of said rasters being wave-shaped in the plane of said screen means, and each of said grooves as viewed in longitudinal cross section thereof being substantially the same depth along its entire length.

2. A projection screen comprising a thin plate of transparent material, a raster of grooves in one surface of said plate, said grooves extending in straight directions equidistantly spaced apart, a raster of grooves in the other surface of said plate, said latter grooves extending in curved directons equidistantly spaced apart, parts of said first named raster of grooves optically coinciding with parts of said second named raster of grooves, and the grooves of at least one of said rasters having a wave shape in the plane of said plate, each of said grooves as viewed in longitudinal cross section thereof being substantially the same depth along its entire length.

3. A projection device as claimed in claim 2 wherein said curved grooves extend in the form of an Archimedean spiral.

4. A projection device as claimed in claim 2 wherein the wavelengths of said waves are equal to $$\lambda = \frac{\pi a}{n}$$

where $a$ corresponds to the relative spacing of said circular grooves and $n$ is a whole number.

5. A projection screen comprising a transparent plate, said plate having a raster of grooves on one side thereof extending along straight directions equidistantly spaced apart, a second raster of grooves on the other side of said plate optically coinciding with said first raster and extending along concentric circles equidistantly spaced apart, the grooves of both of said rasters being in the form of waves in the plane of said plate, each of said grooves as viewed in longitudinal cross section thereof being substantially the same depth along its entire length, the waves of the grooves of one raster being in phase opposition to the waves of the grooves of the other raster in that portion of the plate at which tangents to the circular directions of one raster of grooves are parallel with the straight directions of the grooves of the other raster.

References Cited in the file of this patent

UNITED STATES PATENTS

| Number | Name | Date |
|---|---|---|
| 670,438 | Shuman | Mar. 26, 1901 |
| 1,942,841 | Shimizu | Jan. 9, 1934 |
| 2,137,358 | Shaw | Nov. 22, 1938 |
| 2,207,835 | Sukumlyn | July 16, 1940 |
| 2,219,158 | Van Benschoten | Oct. 22, 1940 |
| 2,258,164 | De Lassus | Oct. 7, 1941 |
| 2,321,441 | Webber | June 8, 1943 |
| 2,480,031 | Kellogg | Aug. 23, 1949 |
| 2,510,344 | Law | June 6, 1950 |

FOREIGN PATENTS

| Number | Country | Date |
|---|---|---|
| 831,451 | France | June 7, 1938 |